United States Patent
Shin

(10) Patent No.: US 9,638,086 B2
(45) Date of Patent: May 2, 2017

(54) LEAK DETECTION METHOD OF REDUCING AGENT PUMPING SYSTEM

(71) Applicants: Hyundai Motor Company, Seoul (KR); Kia Motors Corporation, Seoul (KR)

(72) Inventor: Jaeseok Shin, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 540 days.

(21) Appl. No.: 14/283,015

(22) Filed: May 20, 2014

(65) Prior Publication Data

US 2015/0143877 A1    May 28, 2015

(30) Foreign Application Priority Data

Nov. 22, 2013  (KR) .................. 10-2013-0143262

(51) Int. Cl.
*G01M 3/00* (2006.01)
*F01N 11/00* (2006.01)
(Continued)

(52) U.S. Cl.
CPC ............ *F01N 11/002* (2013.01); *F01N 3/208* (2013.01); *F01N 11/00* (2013.01); *F01N 13/009* (2014.06); *F01N 2550/05* (2013.01); *F01N 2610/02* (2013.01); *F01N 2610/105* (2013.01); *F01N 2610/14* (2013.01); *F01N 2610/144* (2013.01);
(Continued)

(58) Field of Classification Search
CPC ....... G01M 3/00; G01M 3/002; F01N 11/002; F01N 3/208; F01N 11/00; F01N 13/009; F01N 2550/05; F01N 2610/02; F01N 2610/105; F01N 2610/14; F01N 2610/144; F01N 2610/146; F01N 2900/1808; F01N 2900/1811; Y02T 10/24; Y02T 10/47
USPC ...... 73/46, 40, 40.5 R, 49.7, 114.69, 114.75, 73/1.01, 40.7, 49.1; 374/4, 5; 60/274, 60/272, 277
See application file for complete search history.

(56) References Cited

U.S. PATENT DOCUMENTS

| 5,078,006 A * | 1/1992 | Maresca, Jr. ........... G01F 1/007 73/40 |
| 5,883,815 A * | 3/1999 | Drakulich ............... G01M 3/38 340/501 |

(Continued)

*Primary Examiner* — Lisa Caputo
*Assistant Examiner* — Nathaniel T Woodward
(74) *Attorney, Agent, or Firm* — Morgan, Lewis & Bockius LLP

(57) ABSTRACT

A leak detection method of a reducing agent pumping system including a reducing agent tank, an injector, a line formed through the reducing agent tank and the injector, and a pumping module disposed in the line may include pumping a reducing agent to the injector with a pump of the pumping module and detecting a pressure thereof, operating the pump at a predetermined load or less and stopping an operation of the injector, when it is determined that a detected pressure is between a first set value and a second set value, operating a heater for heating the reducing agent in the pumping module for a predetermined time, and determining that leak occurred in the line between the pumping module and the injector, when it is determined a temperature of the reducing agent in the pumping module is lower than a predetermined value.

11 Claims, 4 Drawing Sheets

(51) Int. Cl.
  *F01N 3/20*     (2006.01)
  *F01N 13/00*    (2010.01)
(52) U.S. Cl.
  CPC  *F01N 2610/146* (2013.01); *F01N 2900/1808*
      (2013.01); *F01N 2900/1811* (2013.01); *G01M*
      *3/00* (2013.01); *G01M 3/002* (2013.01); *Y02T*
      *10/24* (2013.01); *Y02T 10/47* (2013.01)

(56) References Cited

U.S. PATENT DOCUMENTS

| | | | | |
|---|---|---|---|---|
| 6,481,265 B1* | 11/2002 | Weber | ............... | G01M 3/28 |
| | | | | 73/40 |
| 6,807,851 B2* | 10/2004 | Wakahara | .......... | F02M 25/0809 |
| | | | | 73/114.38 |
| 6,993,428 B1* | 1/2006 | Gundrum | ............... | F02D 41/22 |
| | | | | 701/114 |
| 7,107,820 B2* | 9/2006 | Nunnally | ............. | G01M 3/2815 |
| | | | | 73/40 |
| 7,497,076 B2* | 3/2009 | Funk | .................. | B01D 53/9431 |
| | | | | 60/286 |
| 8,197,623 B1* | 6/2012 | Westerman | ........... | G01M 3/002 |
| | | | | 156/64 |
| 8,316,695 B2* | 11/2012 | Jarvie | ................. | G01M 3/2892 |
| | | | | 137/398 |
| 8,561,387 B2* | 10/2013 | Fokkelman | ........... | F01N 3/2073 |
| | | | | 60/274 |
| 8,850,872 B2* | 10/2014 | Jarvie | ................. | G01M 3/2892 |
| | | | | 137/409 |
| 2010/0071349 A1* | 3/2010 | Kitazawa | .............. | F01N 3/2066 |
| | | | | 60/277 |
| 2011/0107742 A1* | 5/2011 | Igarashi | ................. | F01N 3/208 |
| | | | | 60/277 |
| 2013/0047585 A1 | 2/2013 | Cho et al. | | |

* cited by examiner (a)

(b)

LEAK DETECTION METHOD OF REDUCING AGENT PUMPING SYSTEM

CROSS-REFERENCE TO RELATED APPLICATION

The present application claims priority to Korean Patent Application No. 10-2013-0143262 filed on Nov. 22, 2013, the entire contents of which is incorporated herein for all purposes by this reference.

BACKGROUND OF THE INVENTION

Field of the Invention

The present invention relates to a leak detection method of a reducing agent pumping system that pumps a reducing agent safely and pleasantly by pumping a reducing agent stored in a reducing agent tank to an injector and rapidly detecting leak of the reducing agent in the pumping.

Description of Related Art

At present, a diesel oxidation catalyst (DOC) and a diesel particulate filter (DPF), a nitrogen oxide purifying unit (LNT, lean NOx trap), and a selective catalytic reduction unit (SCR) have been considered in diesel engines of vehicle to cope with the exhaust gas regulations.

Particularly, in the requirements of exhaust gases in Europe, ARTEMIS mode is examined instead of NEDC mode, which is a typical actual high-speed running condition. In the actual high-speed running condition, since the DOC+DPF+LNT system exhausts nitrogen oxide (NOx), there is a need of a method of reducing nitrogen oxide.

Accordingly, the selective catalyst reduction system is used, which reduces nitrogen oxide by spraying urea, which is a reducing agent, to the front of a catalyst.

In order to effectively spray urea that is a reducing agent, a pumping pressure of about 9 bar is required, and the reducing agent pumping system may stop when the pumping pressure drops. Bubbles flowing in the pumping line or malfunction of a pressure sensor may stop the reducing agent pumping system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a leak detection method of a reducing agent pumping system having advantages of enabling a reducing agent pumping system to more stably operate by more precisely determining leak in a pumping line even if a pumping pressure for a reducing agent drops due to bubbles flowing in the pumping line or malfunction of a pressure sensor.

In an aspect of the present invention, a leak detection method of a reducing agent pumping system including a reducing agent tank, an injector, a line formed through the reducing agent tank and the injector, and a pumping module disposed in the line, may include pumping a reducing agent to the injector with a pump of the pumping module and detecting a pressure thererof, operating the pump at a predetermined load or less and stopping an operation of the injector, when it is determined that a detected pressure is larger than a first set value and smaller than a second set value which is larger than the first set value, operating a heater for heating the reducing agent in the pumping module for a predetermined time, and determining that leak occurred in the line between the pumping module and the injector, when it is determined a temperature of the reducing agent in the pumping module is lower than a predetermined value.

The method may further include increasing a pump load of the pumping module to a maximum and making a load of the injector to zero when the detected pressure is between the first and second set values.

The method may further include generating a warnign signal when the detcted pressure is lower than the first set value.

The method may further include comparing the first temperature of the reducing agent in the reducing agent tank with a second temperature of the reducing agent in the pumping mold added with a predetermined value, and generating supply pressure drop warning signal when the first first temperature is smaller than the second temperature added with the predetermined value, and restoring the reducing agent when the first first temperature is larger than the second temperature added with the predetermined value.

The method may further include determining that pumping is normally performed, when it is determined that the detected pressure is larger than a third set value which is larger than the second set value.

The method may further include a pressure sensor that is disposed at an outlet of the pump and detects pumping pressure, in the pumping module.

The method may further include a temperature sensor that is disposed at an inlet or an outlet of the pump and detects the temperature of the reducing agent, in the pumping module.

In the determining of the leak, the set value is determined from the temperature of the reducing agent in the reducing agent tank.

After the operating of the heater for a predetermined time, the heater is turned off.

After the heater is turned off, the determining of the leak is performed.

The reducing agent in the reducing agent tank that may include generating a pressure drop warning signal, when it is determined that the detected pressure is a predetermined value or less, is maintained at a predetermined temperature by a coolant of an engine.

According to the present invention, it is possible to effectively prevent the system from temporarily stopping due to bubbles flowing in the supply line of urea or malfunction of the pressure sensor.

Further, when the pumping pressure of urea drops due to a temporal reason, it is possible to easily determine unnecessary actual leak of a reducing agent, using the temperature of the reducing agent in the pumping module.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
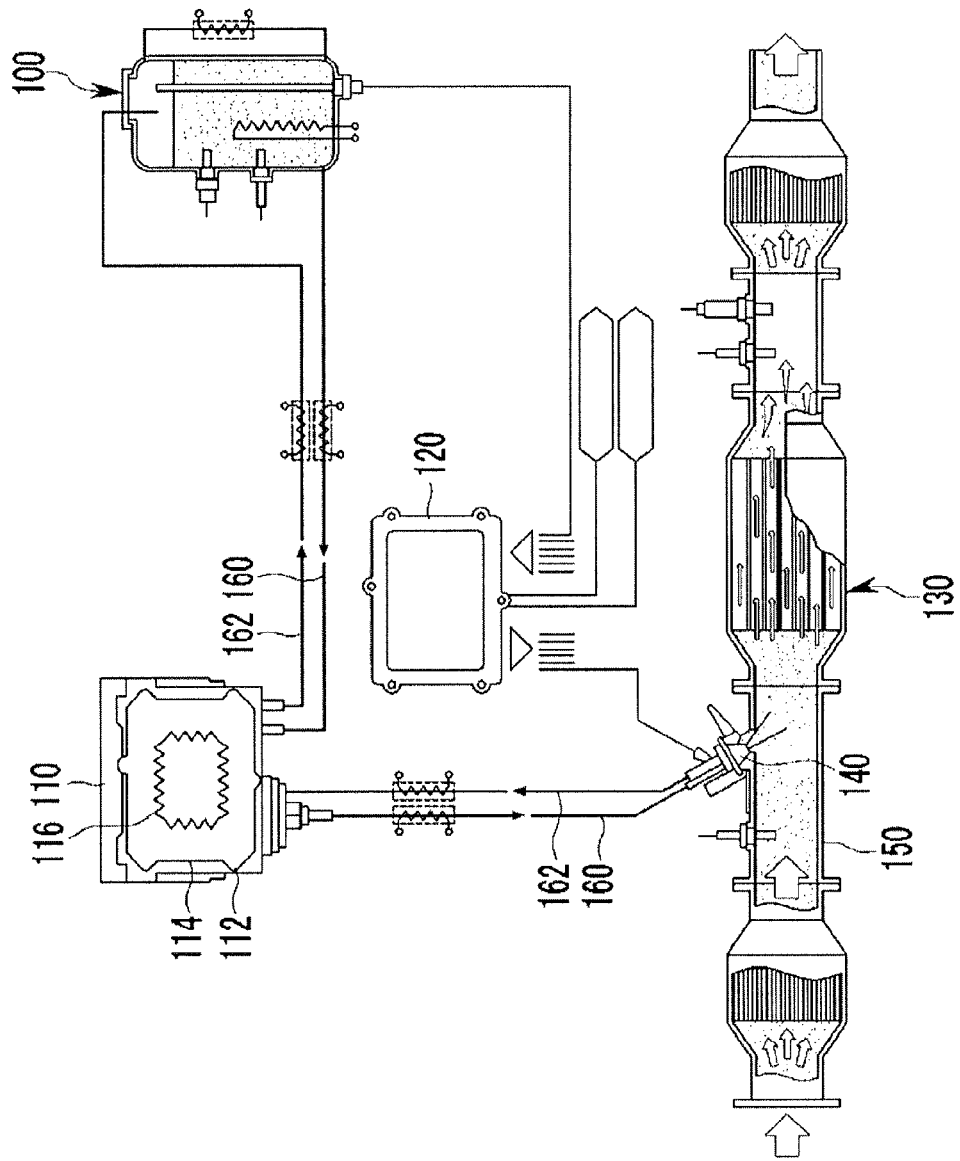
FIG. 1 is a schematic diagram a reducing agent pumping system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram a reducing agent pumping system according to an exemplary embodiment of the present invention.

Referring to FIG. 1, a reducing agent pumping system includes a reducing agent tank 100, a restoring line 162, a supply line 160, a pumping module 110, a pressure sensor 112, a temperature sensor 114, an exhaust line 150, an injector 140, a selective catalytic reduction unit 130, and a dodging controller 120.

The injector 140 is disposed in the exhaust line 150 to spray a reducing agent to an exhaust gas passing through the exhaust line 150 and the selective catalytic reduction unit 130 is disposed at the downstream side further than the injector 140.

The reducing agent that is sprayed from the injector is an aqueous urea solution and the reducing tank 100 is filled with an aqueous urea solution. The reducing agent tank 100 and the injector 140 are connected through a line and the line includes the supply line 160 and the restoring line 162.

The pumping module 110 is disposed at the middle of the supply line 160 and the restoring line 162. A pump which pumps a reducing agent from the reducing agent tank 100 to the injector 140 is disposed in the pumping module 110.

The pressure sensor 112 and the temperature sensor 114 which detect the pressure and temperature of the pumped reducing agent, respectively, are disposed in the pumping module 110, in which the pressure sensor 112 is disposed at the outlet of the pump and the temperature sensor 114 may be disposed at the outlet or the inlet.

The pumping module 110, the reducing agent tank 100, the supply line 160, and the restoring line 162 are each provided with a heater to prevent the aqueous urea solution, which is a reducing agent, from freezing.

The heater of the reducing agent tank 100 controls the temperature of the reducing agent with the coolant of a engine, the pumping module 110, the supply line 160, and the restoring line 162 are provided with an electric heater 116, and the reducing agent tank 100 is equipped with a lever sensor too which detects the level of the aqueous urea solution.

The dodging controller 120 allows the aqueous urea solution, which is a reducing agent, to be sprayed to the exhaust gas passing through the exhaust line 150 by controlling the pumping module 110 and the injector 140 on the basis of the operation information and diagnosis information of the engine.

In an exemplary embodiment of the present invention, when it is determined that the pumping pressure detected by the pressure sensor 112 of the pumping module 110 is 7.5 bar or more, it is determined that pumping is normally performed. On another hand, when the pumping pressure is less than 0.5 bar, the pumping pressure is low and a warning signal is generated.

When it is determined that the pumping pressure detected by the pressure sensor 112 of the pumping module 110 is 0.5 bar or more and less than 7.5 bar, a leak detection mode is performed. In an exemplary embodiment of the present invention, 7.5 bar and 0.5 bar are values set in advance.

When the leak detection mode is performed, the pump of the pumping module 110 is operated at the maximum output and the injector 140 stops operating. The heater 116 of the pumping module 110 is turned on and a set time (about 40 seconds) is maintained.

Further, the heater 116 of the pumping module 110 is turned off and the first temperature of the reducing agent in the pumping module 110 and the second temperature of the reducing agent in the reducing agent tank 100 are compared.

When the value obtained by adding a predetermined value (5° C.) to the second temperature is larger than the first temperature, the dodging controller 120 generates a pressure drop warning signal. Further, when the value obtained by adding a predetermined value (5° C.) to the second temperature is the first temperature or less, the dodging controller 120 restores the reducing agent in the supply line 160 through the restoring line 162 by controlling the pumping module 110.

In an exemplary embodiment of the present invention, with the injector 140 turned off and the pump of the pumping module 110 operated at the maximum output, when leak occurs at the downstream side from the pumping module 110, a new reducing agent is supplied from the reducing agent tank 100 even though the heater 116 of the pumping module 110 heats the existing reducing agent, such that the temperature does not rapidly increase.

In contrast, with the injector 140 turned off and the pump of the pumping module 110 operated at the maximum output, when there is no leak at the downstream side from the pumping module 110, the heater 116 of the pumping module 110 heats the reducing agent and a new reducing agent is not supplied from the reducing agent tank 100, such that the temperature of the reducing agent continuously increases.

Accordingly, in an exemplary embodiment of the present invention, with the injector 140 turned off and the pump of the pumping module 110 operated at the maximum output, leak in the supply line 160 is determined by comparing the temperature of the reducing agent in the pumping module 110 with a predetermined value (temperature of the reducing agent in the reducing agent tank+5° C.).

In an exemplary embodiment of the present invention, it is possible to effectively prevent the system from temporarily stopping due to bubbles flowing in the supply line of urea that is a reducing agent or malfunction of the pressure sensor. Further, when the pumping pressure of urea drops due to a temporal reason, it is possible to easily determine leak of a reducing agent, using the temperature of the reducing agent in the pumping module.

Figure 2:
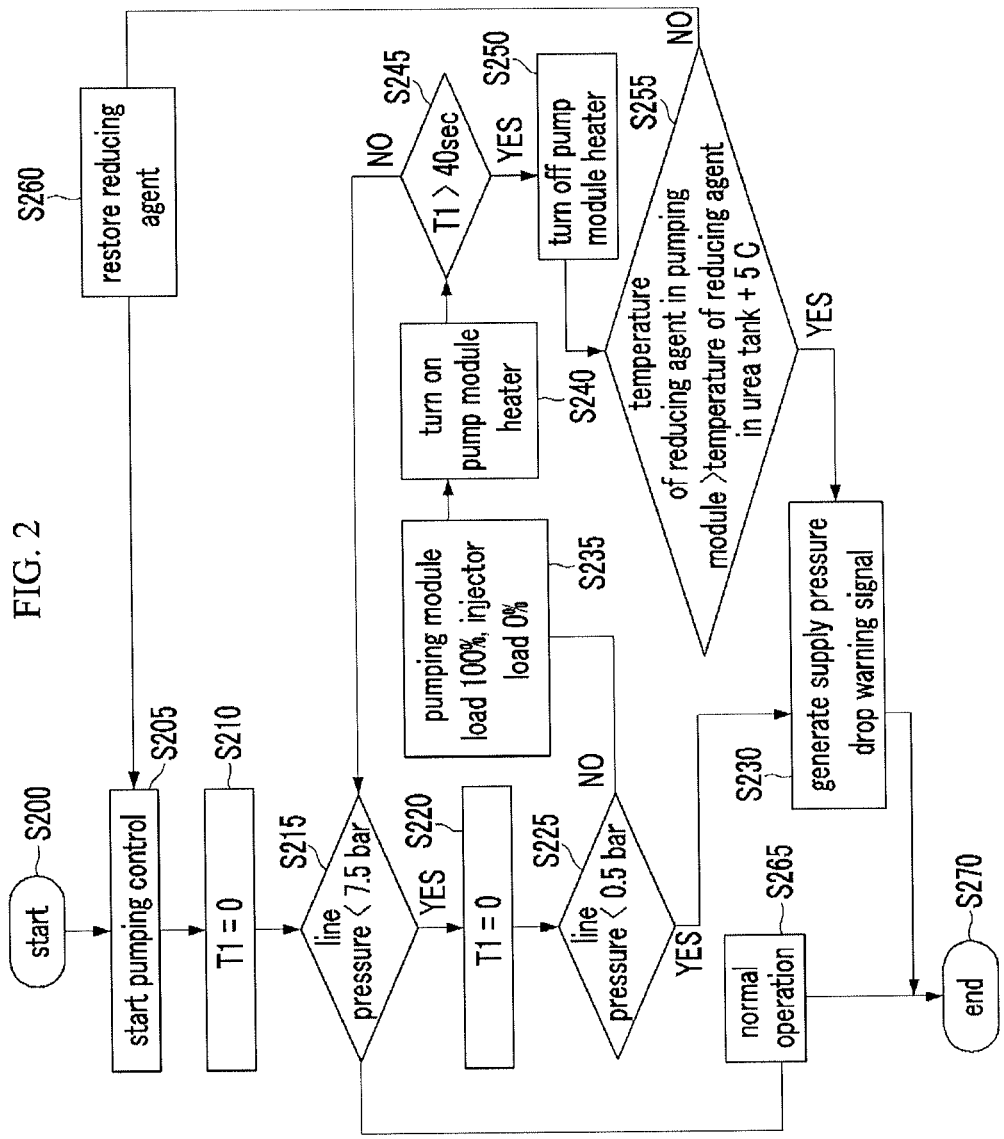
FIG. 2 is a flowchart illustrating a leak detection method of a reducing agent pumping system according to an exemplary embodiment of the present invention.

FIG. 2 is a flowchart illustrating a leak detection method of a reducing agent pumping system according to an exemplary embodiment of the present invention.

Referring to FIG. 2, control starts in S200, the pump of the pumping module 110 pumps an aqueous urea solution that is a reducing agent in S205, and a timer starts operation from zero in S210.

In S215, it is determined whether the line pressure by the pump of the pumping module 110 is smaller than 7.5 bar.

S265 is performed when the line pressure is larger than 7.5, S220 is performed and the timer starts operating when the line pressure is 7.5 bar or more, and whether the line pressure is smaller than 0.5 bar is determined in S225.

When the line pressure is smaller than 0.5 bar, it is determined that the line pressure dropped abnormally and a warning signal is generated in S230. When it is determined that the line pressure is 0.5 bar or more, S235 is performed.

In S235, the pump load of the pumping module 110 is increased to the maximum and the load of the injector 140 is made zero. It is determined whether 40 seconds have passed in S245. When 40 seconds do not pass, the process returns to S215, and when 40 seconds have passed, S250 is performed.

The heater 116 that heats the reducing agent in the pumping module 110 is turned off in S250 and the first temperature of the reducing agent in the pumping module 110 and the second temperature of the reducing agent in the reducing agent tank 100 are compared in S255.

In more detail, 5° C. is added to the second temperature, and when the resultant value is smaller than the first temperature, S230 is performed, and when the resultant value is the first temperature or more, S260 is performed. In S260, the pumping module 110 restores the reducing agent in the supply line 160 through the restoring line 162.

In an exemplary embodiment of the present invention, refer to those known in the art, for the structure in which the pump of the pumping module 110 pumps an aqueous urea solution that is a reducing agent, the structure in which it restores the aqueous urea solution in the supply line 160, the structure of the injector 140, and the method of controlling the parts with the dodging controller 120, and the detailed description is not provided.

Further, the dodging controller 120 executes a series of programs or instructions for performing the leak detection method of a reducing agent pumping system according to an exemplary embodiment of the present invention.

Figure 3:
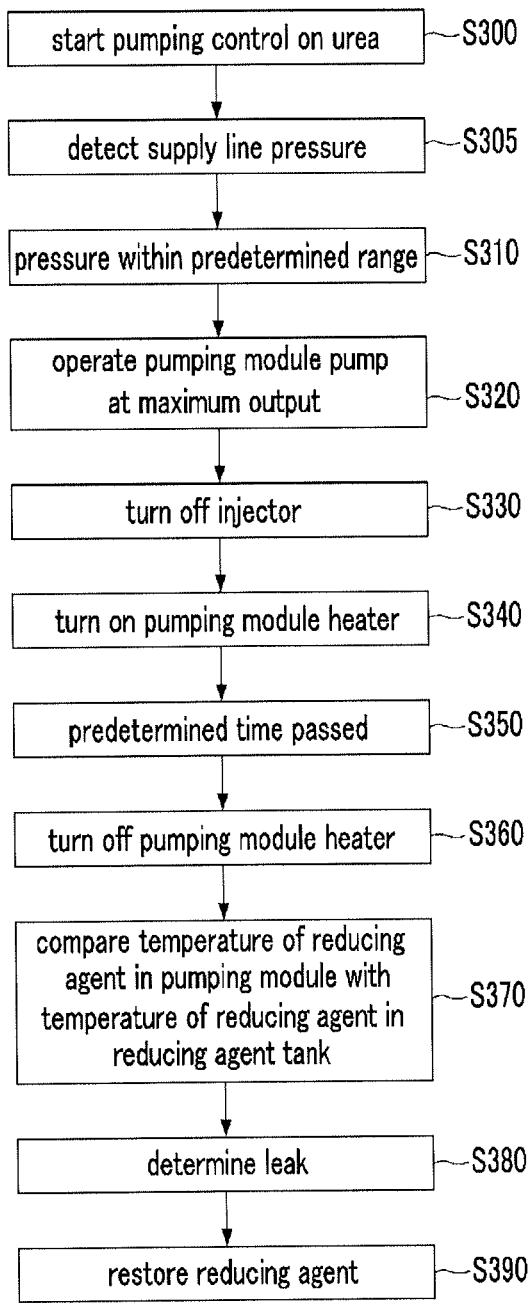
FIG. 3 is a flowchart illustrating the leak detection method of a reducing agent pumping system according to an exemplary embodiment of the present invention.

FIG. 3 is a flowchart illustrating the leak detection method of a reducing agent pumping system according to an exemplary embodiment of the present invention.

Referring to FIG. 3 pumping control on urea that is a reducing agent is started in S300 and the line pressure of the supply line through which urea is pumped is detected in S305. In S310, it is determined whether the line pressure is within a predetermined range. When the line pressure is over the predetermined range, it is determined that the system is in a normal state, and when it is smaller than the predetermined range, an emergency warning signal is generated.

When the line pressure is within the predetermined range, the pump of the pumping module 110 is operated at the maximum output in S320 and the injector 140 is turned off in S330. The heater 116 of the pumping module 110 is turned on in S340 and the predetermined time passes with the heater 116 turned on in S350.

The heater 116 of the pumping module 110 is turned off in S360, the temperature of the reducing agent in the pumping module 110 and the temperature of the reducing agent in the reducing agent tank 100 are compared in S370, and it is determined whether there is leak in the supply line 160 in S380. Further, the reducing agent in the supply line 160 is restored to the reducing agent tank 100 by the restoring function of the pumping module 110 in S390.

Figure 4:
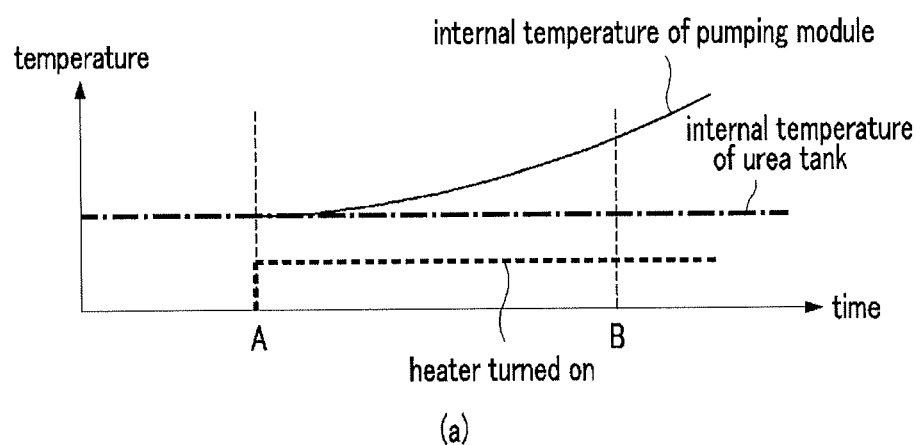
FIG. 4 is a graph showing temperature according to the leak state in a reducing agent pumping system according to an exemplary embodiment of the present invention.
Figure 4:
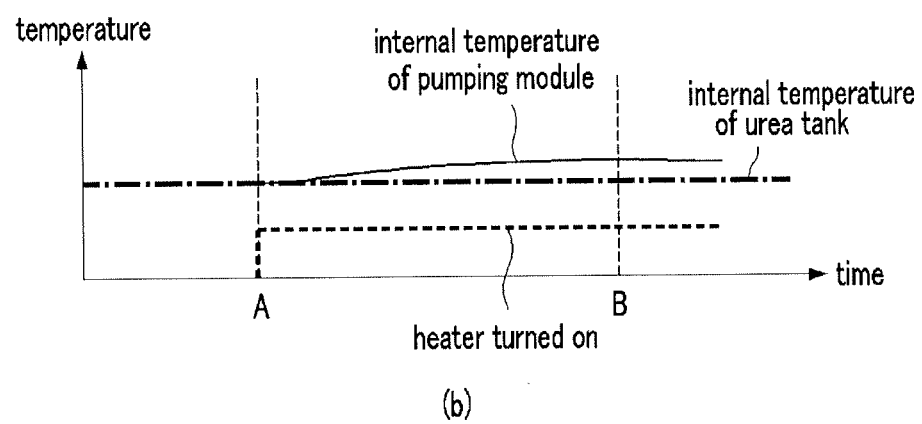

FIG. 4 is a graph showing temperature according to the leak state in a reducing agent pumping system according to an exemplary embodiment of the present invention.

Referring to (a) of FIG. 4, the horizontal axis shows time and the vertical axis shows temperature. As shown in the figure, when the heater 116 is turned on, the internal temperature (reducing agent temperature) of the reducing agent tank 100 (urea tank) is maintained at a predetermined level, but the internal temperature (reducing agent temperature) of the pumping module 110 gradually increases. The reason that the internal temperature of the pumping module 110 gradually increases means that a reducing agent does not leak.

Referring to (b) of FIG. 4, the horizontal axis shows time and the vertical axis shows temperature. As shown in the figure, even though the heater is turned on, the internal temperature (reducing agent temperature) of the pumping module 110 increases little, as compared with the internal temperature (reducing agent temperature) of reducing agent tank 100. The reason that the internal temperature of the pumping module 110 increases less means that the reducing agent leaks and a new reducing agent is supplied to the pumping module 110.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A leak detection method of a reducing agent pumping system including a reducing agent tank, an injector, a line formed through the reducing agent tank and the injector, and a pumping module disposed in the line, the method comprising:

pumping a reducing agent to the injector with a pump of the pumping module and detecting a pressure of the reducing agent;

operating the pump at a predetermined load or less and stopping an operation of the injector, when it is determined that a detected pressure is larger than a first set value and smaller than a second set value which is larger than the first set value;

operating a heater for heating the reducing agent in the pumping module for a predetermined time; and determining that leak occurred in the line between the pumping module and the injector, when it is determined a temperature of the reducing agent in the pumping module is lower than a predetermined value.

2. The method of claim 1, further comprising:

increasing a pump load of the pumping module to a maximum and making a load of the injector to zero when the detected pressure is between the first and second set values.

3. The method of claim 1, further comprising:

generating a warning signal when the detected pressure is lower than the first set value.

4. The method of claim 1, further comprising:

comparing the first temperature of the reducing agent in the reducing agent tank with a second temperature of the reducing agent in the pumping mold added with a predetermined value; and generating supply pressure drop warning signal when the first temperature is smaller than the second temperature added with the predetermined value; and restoring the reducing agent when the first temperature is larger than the second temperature added with the predetermined value.

5. The method of claim 1, further comprising:

determining that pumping is normally performed, when it is determined that the detected pressure is larger than a third set value which is larger than the second set value.

6. The method of claim 1, further comprising:

a pressure sensor that is disposed at an outlet of the pump and detects pumping pressure, in the pumping module.

7. The method of claim 1, further comprising:

a temperature sensor that is disposed at an inlet or an outlet of the pump and detects the temperature of the reducing agent, in the pumping module.

8. The method of claim 1, wherein in the determining of the leak, the set value is determined from the temperature of the reducing agent in the reducing agent tank.

9. The method of claim 1, wherein after the operating of the heater for a predetermined time, the heater is turned off.

10. The method of claim 9, wherein after the heater is turned off, the determining of the leak is performed.

11. The method of claim 1, wherein the reducing agent in the reducing agent tank that includes generating a pressure drop warning signal, when it is determined that the detected pressure is a predetermined value or less, is maintained at a predetermined temperature by a coolant of an engine.

* * * * *